Jan. 19, 1954 | J. W. PARKER | 2,666,577

COMPUTER BOARD

Filed Aug. 12, 1952 | 2 Sheets-Sheet 1

INVENTOR.
John W. Parker
BY
ATTORNEY

Jan. 19, 1954 J. W. PARKER 2,666,577

COMPUTER BOARD

Filed Aug. 12, 1952 2 Sheets-Sheet 2

INVENTOR.
John W. Parker

BY George Renehan

ATTORNEY

Patented Jan. 19, 1954

2,666,577

UNITED STATES PATENT OFFICE 2,666,577

COMPUTER BOARD

John W. Parker, Mount Vernon, N. Y.

Application August 12, 1952, Serial No. 304,046

3 Claims. (Cl. 235—61)

Figure 1:
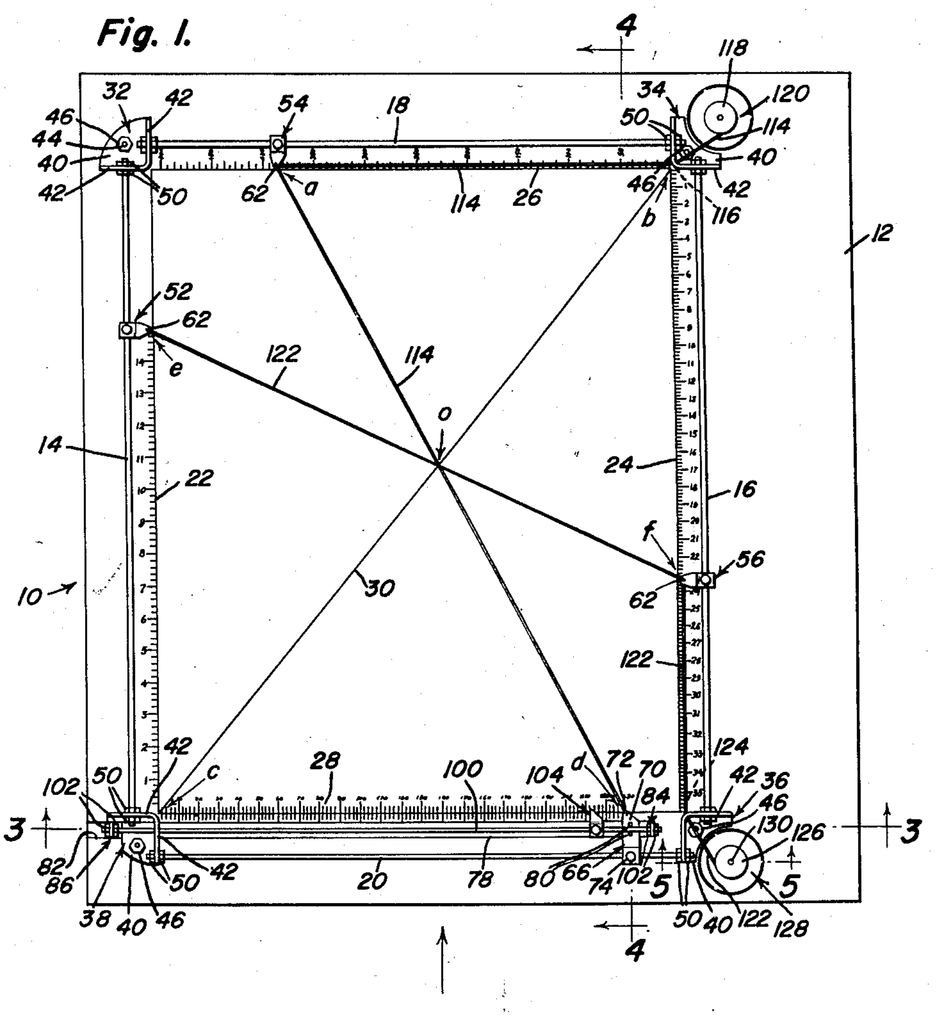

(Granted under Title 35, U. S. Code (1952), sec. 266)

The invention described herein may be manufactured and used by or for the Government for governmental purposes without the payment to me of any royalty thereon.

The invention relates generally to calculators and particularly to those of the computer board type.

It is an object of this invention to provide a calculator for solving mathematical problems of the form: $d$ equals $f(a)\times f(b)\times f(c)$.

It is another object of this invention to provide a calculator for solving mathematical problems of the form $d$ equals $f(a)\times f(b)\times f(c)$, wherein said calculator comprises a board having indicia thereon and means movable relative to said indicia.

It is a further object of this invention to provide a calculator for solving mathematical problems of the form: $d$ equals $f(a)\times f(b)\times f(c)$, wherein said calculator comprises a board having an index line and scales thereon, slides movable relative to said scales, and a plurality of means connecting pairs of said slides and being adapted to cross each other and said index line.

It is a still further object of this invention to provide a calculator for solving mathematical problems of the form: $d$ equals $f(a)\times f(b)\times f(c)$, wherein said calculator comprises a computer board having an index line and scales fixed thereon, movable slides, a plurality of means connecting pairs of said slides and being adapted to cross each other and said index line, and a secondary slide associated with one of said slides which constitutes a means for modifying the reading of said last mentioned slide, which is useful in solving a particular type of problem.

It is a specific object of this invention to provide a readily operable device for solving mathematical problems which arise in the course of preparing impregnating solutions for saturating protective clothing. In preparing impregnating solutions it is necessary to employ the following formulae:

$$S_c=\frac{S_1D_1C_1}{D_cC_c} \text{ or } S_c=\frac{S_1D_1C_1}{D_cC_c}-\frac{S_tD_tC_t}{D_cD_c}$$

In the past these formulae were solved by using a mental process which included multiplication and division, usually of figures that included decimals. The process was slow and subject to human error. The device contemplated by my invention is simple, fast, accurate and can be successfully operated by individuals having a limited understanding of mathematics.

It is a further specific object of this invention to provide a calculator which will solve mathematical problems involved in preparing impregnating solutions wherein it is desired to: (1) determine the amount of a concentrated suspension to add to water to prepare a desired amount of impregnating solution of a desired concentration, (2) determine the amount of concentrated suspension and water to add to an existing impregnating solution to increase its potency to a desired concentration and to produce a desired amount of impregnating solution, and (3) determine the amount of water to be added to an existing impregnating solution to reduce its potency to a desired concentration.

Figure 2:
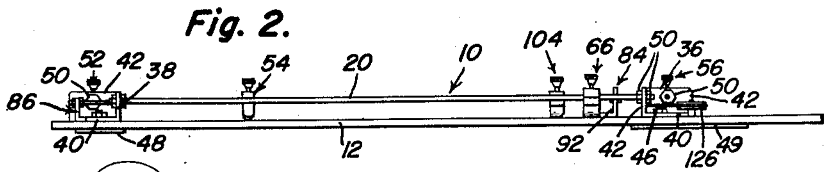
Figure 7:
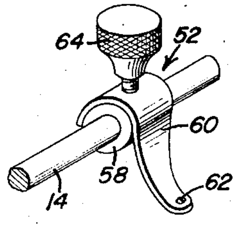
Figure 3:
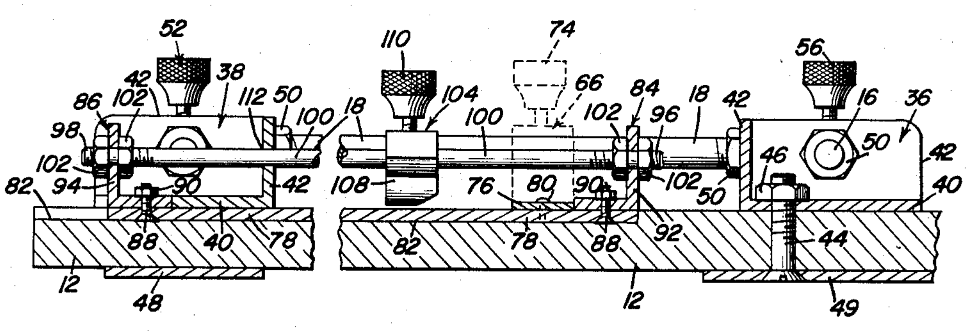
Figures 4, 5:
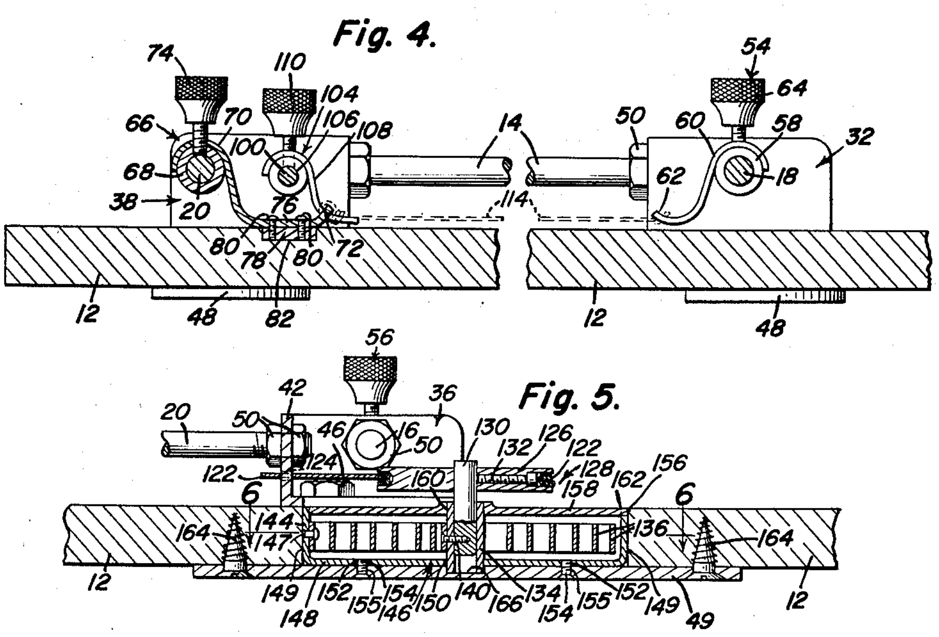
Figure 6:
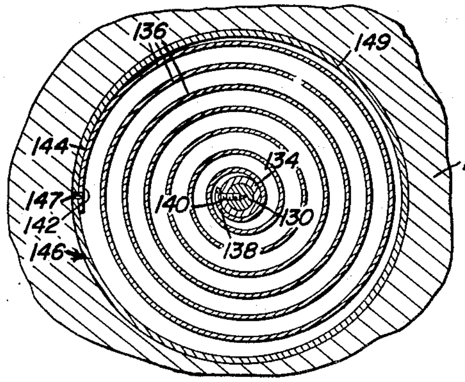

The above and other objects will appear from the following description and drawings. Like reference characters refer to like structure throughout the views of the drawings, wherein: Fig. 1 is a plan view of the calculator. Fig. 2 is an end elevation looking in the direction of the arrow in Fig. 1. Fig. 3 is a sectional view taken on line 3—3 of Fig. 1. Fig. 4 is a sectional view taken on line 4—4 of Fig. 1. Fig. 5 is a sectional view taken on line 5—5 of Fig. 1. Fig. 6 is a sectional view taken on line 6—6 of Fig. 5. Fig. 7 is a perspective view of one of the elements of the device.

Referring to the drawings and particularly to Fig. 1, the calculator is indicated generally as 10, and comprises rectangular board 12, which can be made of plywood, metal, plastic or other equivalent material, which supports elongated, tubular guides 14, 16, 18, and 20 which are associated with scales 22, 24, 26, and 28 that are mounted on the board 12. The scales may be separate and removable from the board 12, or they may all be printed on a chart which is secured to the board and covered with a transparent, protective coating. In either event, a permanent, diagonal, index line 30 is provided which extends from the corner formed by the intersection of scales 22 and 28 to the corner formed by the intersection of scales 24 and 26.

Tubular guides 14 and 16 are disposed parallel to each other, and are parallel and adjacent to scales 22 and 24 respectively, and tubular guides 18 and 20 are disposed parallel to each other, and are parallel and adjacent to scales 26 and 28 respectively. The guides are supported above the plane of the upper surface of the board 12 by metal corner supports 32, 34, 36 and 38. From Fig. 1 it will be observed that each guide is secured and supported at each of its ends by a corner support. For example, guide 14 is secured to and supported by corner supports 32 and 38.

By referring to Figs. 1–3 it will be seen that each of the corner supports comprises a base plate 40 and an upstanding, L-shaped flange 42. The corner supports are secured to board 12 by hold down bolts 44 which pass through the board 12 and the base plates 40 and have securing nuts 46 threaded thereon. Two pairs of bearing plates 48 and 49 are positioned beneath the board 12 (see Figs. 2–4). Bearing plates 48 are flat, apertured, metal plates and are associated with corner supports 32 and 38 (see Fig. 4), whereas bearing plates 49, which are associated with corner supports 34 and 36, are slightly more complicated and will subsequently be described in detail. The guides are threaded at their ends and pass through openings in flanges 42 of the adjacent corner supports and are secured rigidly thereto by locking nuts 50. The guides could be secured to the corner supports by other equivalent means.

By referring to Fig. 1 it will be seen that three of the slides, indicated as 52, 54 and 56 are identical and slidably supported on guides 14, 18, and 16 respectively. The structure of each of these slides can be more readily understood by viewing Fig. 7, where one of the slides (slide 52) is shown mounted on a portion of a guide (guide 14). Slide 52 comprises sleeve-like, slideable carriage 58, which is adapted to surround guide 14 and slide thereon, to which is secured tapered, bent pointer 60, which has eyelet 62 formed near its tip. The carriage and pointer have aligned, threaded apertures (unnumbered) which are adapted to house threaded, thumb screw 64 which can be tightened to contact the guide and thereby temporarily secure the slide on the guide, or loosened to permit movement of the slide relative to the guide.

By referring to Figs. 1 to 4, it will be seen that guide 20 supports slide 66 which is different from the three slides (52, 54, and 56) above described. Slide 66 comprises a sleeve-like, slideable carriage 68, bent pointer 70 having an eyelet 72 formed therein at its tip, the carriage 68 and pointer 70 having aligned, threaded apertures (unnumbered) which are adapted to receive threaded, thumb screw 74. Bent pointer 70 has a flat, horizontally disposed portion 76 which is secured to flat, slide bar 78 by rivets 80 or their equivalent (see Fig. 4). Slide bar 78 is slideably received within groove 82, which is formed in the board 12 and is disposed parallel to guide 20 (see Figs. 1, 3, and 4). By referring particularly to Fig. 3, it will be seen that slide bar 78 has L-shaped, angle irons 84 and 86 secured to its respective ends by conventional securing means such as bolts 88 and nuts 90. The upstanding walls 92 and 94 of angle irons 84 and 86 respectively have horizontally aligned apertures formed therein which are adapted to receive the threaded ends 96 and 98 of auxiliary, tubular guide 100. Locking nuts 102 are mounted on the threaded ends of the auxiliary guide 100 retaining it rigidly in place on the angle irons. The auxiliary guide 100, angle irons 84 and 86 and slide bar 78 form a unitary structure which is adapted to be moved as a unit with slide 66 when said slide is moved on guide 20. During movement, this unitary structure is guided by bar 78 sliding in groove 82. Auxiliary guide 100 is disposed parallel to and spaced from guide 20 and is adapted to slideably receive auxiliary slide 104 which comprises sleeve-like carriage 106 and pointed, bent pointer 108, which have aligned, threaded apertures (unnumbered) that are adapted to receive threaded, thumb screw 110. Auxiliary slide 104 may be moved on auxiliary guide 100 within the limits formed by angle 84 and flange 42 of corner support 38, and may be temporarily secured in place at any point therebetween by thumb screw 110. It will be observed from Figs. 1 to 3 that the slide bar 78 extends under the base plate 40 of corner support 38, that auxiliary guide 100 passes through and is slidable in opening 112 formed in flange 42 of said corner support, and that the angle irons 84 and 86 are on opposite sides of said flange.

Referring particularly to Fig. 1, it will be seen that string 114, which may be of nylon or equivalent material, is secured in and extends from eyelet 72 of the slide 66 to and through eyelet 62 formed in slide 54, to and through opening 116 formed in the apex of L-shaped flange 42 of corner support 34, and to pulley 118, to which it is attached and which forms a part of tension maintaining unit 120, the structure of which will subsequently become apparent. A second string 122, made of the same material as string 114 but preferably of a contrasting color, is secured in and extends from eyelet 62 of the slide 52, to and through eyelet 62 of the slide 56, to and through opening 124 formed in the apex of L-shaped flange 42 of corner support 36, and to pulley 126, to which it is attached and which forms a part of tension maintaining unit 128. Tension maintaining unit 128, which is identical in structure to tension maintaining unit 120, will now be described in detail.

Referring to Fig. 5, it will be seen that tension maintaining unit 128 comprises pulley 126 which is secured to pulley shaft 130 for rotation therewith by set screw 132, pulley shaft 130, which is received within and secured to bushing 134, coil spring 136, and spring case 146. As can be seen in Fig. 6, the inner end 138 of coil spring 136, the bushing 134 and the pulley shaft 130 are secured together by bolt 140. The outer end 142 of spiral, coil spring 136 is secured to upstanding wall 144 of cup-shaped, spring case 146 by rivet 147. Spring case 146 comprises said upstanding wall 144 and bottom wall 148, and is positioned within circular opening 149 formed in board 12. Bottom wall 148 of said spring case has a central opening 150 which constitutes a lower bearing for bushing 134, and threaded apertures 152 which are adapted to receive bolts 154, which pass through openings 155 in bearing plate 49, thereby securing said spring case in a stationary position relative to the board 12. Upstanding wall 144 of the spring case has a plurality of notches 156 formed in its upper periphery. Spring case closure 158 is mounted on the spring case and has a central opening 160 which constitutes an upper bearing for bushing 134, and horizontally extending tabs 162 formed on its outer periphery which are adapted to be received in notches 156 of the upstanding wall 144 thereby seating said closure on said casing. Bearing plate 49, which is secured to the underside of board 12 by screws 164 has a central recess 166 formed therein which constitutes a bottom bearing for the lower end of bushing 134.

The above described tension maintaining unit operates in the following manner: the pulley 126, the pulley shaft 130, and the bushing 134 are rotatable as a unit. The unit is supported by bushing 134 which has bearing contact with upper bearing 160, lower bearing 150 and the bottom bearing 166. The spiral, coil spring 136 is initially coiled in such a manner that when it is released it urges the pulley 126 to rotate in a counter-clockwise manner as viewed in Fig. 1. This has the effect of maintaining the string which is attached to the pulley in a taut condition. Tension maintaining unit 120 maintains string 114 taut, and tension maintaining unit 128 maintains string 122 taut.

The scales 22, 24, 26, and 28 constitute graphic representations of the numerical values of the four elements of the equation:

$$d=f(a)\times f(b)\times f(c)$$

In the specific application of adapting the board to solve problems involved in preparing impregnating solutions, the scale 22 represents the percentage of concentrate desired in the impregnating solution, the scale 24 represents the percentage of concentrate in the concentrated suspension, the scale 26 represents the gallons of impregnating solution desired, and the scale 28 represents the gallons of concentrated suspension required. The board is operated in the following manner to determine the amount (in gallons) of concentrated suspension required to prepare a desired amount of impregnating solution of a desired concentration when using a concentrated suspension of known concentration. The slide 52 is moved to the point on scale 22 that corresponds to the desired concentration of the impregnating solution and the thumb screw tightened to retain it temporarily in position. The slide 56 is moved to the point on the scale 24 that corresponds to the percentage of concentration of the concentrate used and the thumb screw tightened to temporarily retain it in position. It should be kept in mind that the string 122 is maintained in a taut condition by the tension maintaining unit 128 regardless of the position of the slides 52 and 56. The slide 54 is moved to the point on the scale 26 that corresponds to the amount (in gallons) of the impregnating solution desired and the thumb screw tightened to retain it temporarily in place. Slide 66 is then moved until the string 114 intersects both string 122 and the diagonal line 30 at the same point. The pointer of slide 66 will then be positioned at the point on the scale 28 which constitutes the amount (in gallons) of concentrate required. Finding answers to problems of this type has been found to take considerably less time when using the computer board than was required by the previously used method which included mathematical computation.

The theory of the board very briefly is that it is designed so that the triangle *a o b* is similar to the triangle *c o d*, and the triangle *e o c* is similar to triangle *b o f*, when the strings intersect each other and the diagonal at the same point. By geometrical analysis, it can be proved that:

$$\frac{ab}{cd}=\frac{bf}{ec}$$

In addition to the above discussed standard problem involved in preparing an impregnating solution, the board will solve some special problems. For example: to prepare a desired amount of impregnating solution of a desired concentration when a known amount of impregnating solution of a known weaker concentration is available, the board may be used to determine the amount of concentrate and water which should be added to the weak impregnating solution to get the desired amount of impregnating solution at the desired concentration. Problems of this type are solved by setting the concentration of the weak impregnating solution on scale 22 and the number of gallons of the weak impregnating solution on scale 26. Slide 56 is set on scale 24 at a point which corresponds to the concentration of the concentrate. Slide 66 is then moved until string 114 intersects string 122 and diagonal line 30 at the same point. Auxiliary slide 104 is then moved to the left on auxiliary guide 100 as far as it will go and tightened at that point. In this tightened condition, auxiliary slide 104 will move with slide 66 and maintain the same distance therebetween. By following the procedure used for determining the amount of concentrate needed to prepare an impregnating solution from a concentrate and water (the standard type of problem first described above) the answer will be indicated by pointer 108 of slide 104. This reading constitutes the amount of concentrate to add to the weak impregnated solution to increase its potency to the desired concentration. The theory for solving this type of problem is that you first determine the amount of concentrate (in gallons) that exists in the weak solution, and then you determine the amount of concentrate (in gallons) needed in the desired stronger solution; by subtracting the former from the latter, the additional amount of concentrate needed is ascertained. The auxiliary slide 104 makes it possible to coordinate these two steps and to automatically subtract the amount of concentrate existing in the weak solution from the amount necessary for the stronger solution, and thereby give a final reading of the amount necessary to add to the weak solution.

The third type of problem which occurs in preparing impregnating solutions which the board solves is that wherein an existing impregnating solution has a stronger concentration than that desired and it is desired to determine the amount of water that should be added to the strong impregnating solution to weaken it to the desired concentration. To solve this type of problem the percentage of concentration desired is set on scale 22, the concentration of the existing impregnating solution is set on scale 24 and the amount of existing impregnating solution is set on the scale 28 by slide 66. By moving slide 54 along scale 26 until string 114 intersects both the string 122 and the diagonal 30 at the same point, the point indicated by the tip of pointer 60 of slide 54 corresponds to the total amount of impregnating suspension which you will be able to prepare at the desired concentration. By adding water to the existing impregnating solution until a total volume is reached equal to the amount shown on scale 26, the desired concentration will be attained.

Three specific types of problems which arise in the preparation of impregnating solutions have been illustrated as being capable of solution by the board. It should be kept in mind that these are merely examples of the types of problems that the board can solve, and that it is capable of solving all mathematical problems of the form: $d=f(a)\times f(b)\times f(c)$. The graduations and indicia of the scales used depend upon the specific elements of the particular formula involved.

The invention has been described in great detail for the purpose of illustration and should not be limited thereby since various changes may be made without departing from the spirit of the invention or exceeding the scope of the appended claims.

I claim:

1. A calculating instrument comprising a rectangular base, a stationary diagonal line connecting two opposite corners of said base, a scale disposed near each side of said base, an elongated guide positioned adjacent to each of said scales, a slide movably mounted on each of said guides and having a pointer portion that overlies and indicates a point on its associated scale, a plurality of line-shaped elements arranged to each connect a pair of opposing slides, one of said slides supporting an auxiliary guide which is movable therewith, and an auxiliary slide movably mounted on said auxiliary guide.

2. A device as defined in claim 1 wherein said auxiliary slide includes means for temporarily maintaining said auxiliary slide in fixed position relative to said auxiliary guide.

3. A calculating instrument comprising a rectangular base, a fixed index line extending across said base from one corner to the diagonally opposite corner, a guide member extending along each side of said rectangular base, a slide mounted on and movable along each guide member, a scale extending along each guide member, said guide members and scales being secured in a fixed rectangular relationship, two and only two flexible extensible line shaped elements connected to said slides, each of said elements connecting two slides positioned on opposite sides of the rectangle, and a pointed portion on each of said slides which overlies the associated scale and indicates points thereon.

JOHN W. PARKER.

References Cited in the file of this patent

UNITED STATES PATENTS

| Number | Name | Date |
|---|---|---|
| 666,091 | Ferguson | Jan. 15, 1901 |
| 2,296,799 | Rosin | Sept. 22, 1942 |
| 2,507,460 | Schacht | May 9, 1950 |

FOREIGN PATENTS

| Number | Country | Date |
|---|---|---|
| 836,715 | Germany | Apr. 15, 1952 |
| 927,365 | France | Oct. 28, 1947 |

OTHER REFERENCES

"Graphical and Mechanical Computation," page 68; by Joseph Lipka; published by John Wiley & Sons, Inc., New York, in 1918.